A. M. GRUBBS.
ANIMAL TRAP.
APPLICATION FILED JUNE 3, 1916.

1,223,271.

Patented Apr. 17, 1917.

INVENTOR
Albert M. Grubbs
BY
T. J. Geisler
ATTY.

THE NORRIS PETERS CO., PHOTO-LITHO., WASHINGTON, D. C.

UNITED STATES PATENT OFFICE.

ALBERT M. GRUBBS, OF PORTLAND, OREGON.

ANIMAL-TRAP.

1,223,271.

Specification of Letters Patent.

Patented Apr. 17, 1917.

Application filed June 3, 1916. Serial No. 101,627.

*To all whom it may concern:*

Be it known that I, ALBERT M. GRUBBS, a citizen of the United States, and a resident of the city of Portland, county of Multnomah, State of Oregon, have invented a certain new and useful Improvement in Animal-Traps, of which the following is a specification.

My invention relates to animal traps and has for its particular object the further improvement of that type of animal trap described in the Letters Patent of the United States granted to me January 11, 1916, No. 1,167,493.

One of the main objects of my present invention is to so make, and rearrange, the coöperating parts of such trap as to adapt the latter to be manufactured at a very low cost; furthermore, to render the assembling of the parts very simple; at the same time to provide for a strong and durable construction throughout; and, furthermore, to insure the efficient operation of the trap.

To this end my improved trap embodies the novel features hereinafter fully described and illustrated in the accompanying drawings.

In the latter:

Figure 6:
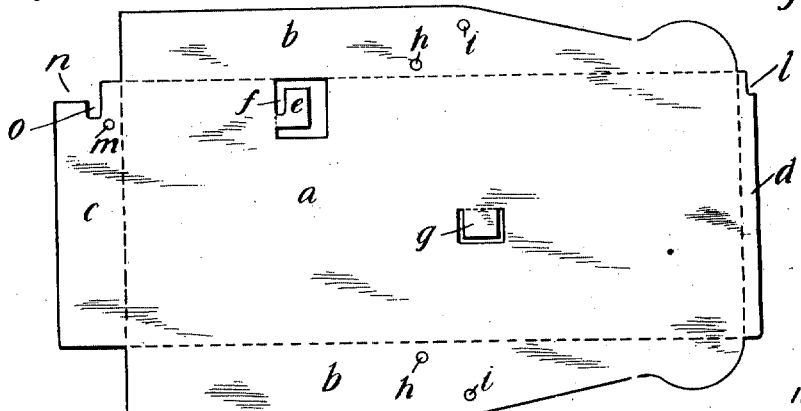
Fig. 6 is a plan view of the blank from which the frame of the trap is formed.

The frame of the trap is conveniently made of a blank, as shown in Fig. 6, and when properly formed comprises a bottom, $a$, having upright flanges $b, b$, at its opposite sides, a rear-end flange $c$, and a front-end flange $d$. The bottom has a piece as $e$ cut out which, when turned up, constitutes one bearing for the rocker shaft $v$. The side flanges $b, b$ are provided with holes $h, h$, and $i, i$. In the holes $h, h$ is inserted the hinge-bar $j$, on which the bait-holding trigger $p$ is pivoted; and in the holes $i, i$ is inserted the hinge-bar on which the jaw $z$ is hinged. Said jaw is controlled and actuated by the coil-spring 7 having a projecting arm 6, which extends through a slot 5 in the cross piece $z'$ of the jaw $z$. The front end of the flange $d$ is made with a cutting edge and has a cut-out portion 1, in which to receive the projecting arm 6 of the coil spring 7, when the trap is in its sprung or unset state.

The back flange $c$ has a perforation $m$ and a cut-away portion $n$, formed with a lateral notch $o$, in which to insert and engage the projecting arm 6 of the actuating spring of the jaw $z$, when the latter is set.

Figure 1:
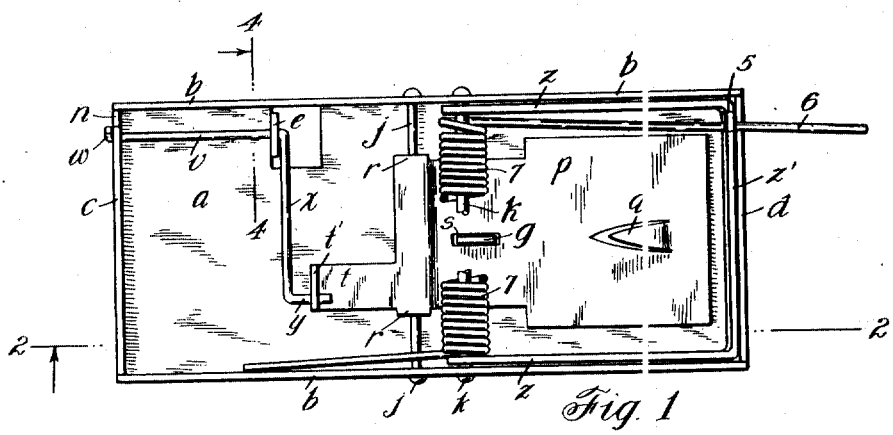
Figure 1 is a plan view of my improved trap.
Figure 2:
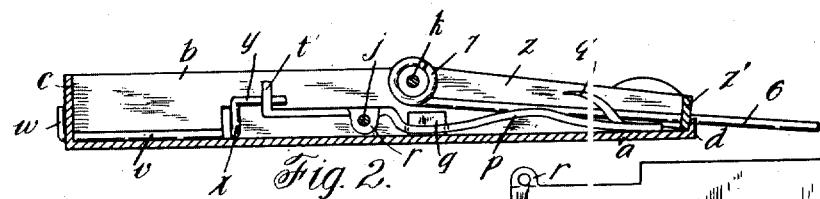
Fig. 2 is a longitudinal, vertical section on the line 2—2 of Fig. 1.
Figure 3:
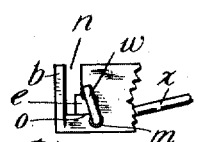
Fig. 3 is a fragmental rear elevation.
Figure 4:
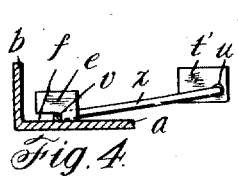
Fig. 4 is a fragmental, transverse, vertical section on the line 4—4 of Fig. 1.
Figure 5:
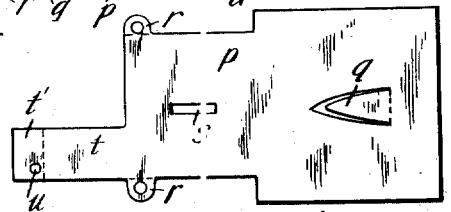
Fig. 5 is a plan view of the blank from which the trigger is formed.

The trigger $p$ is formed from the blank shown in Fig. 5, being provided with a bait-holding hook $q$ and with perforated lateral ears $r$, for mounting the trigger on the hinged bar $j$. The trigger further has a slot $s$, through which projects the upright rib $g$ cut out of the bottom of the blank $a$, and this construction serves to restrain the trigger against lateral displacement on its pivotal support, which might tend to interfere with the proper action of the trigger. The bait-holding portion of the trigger is made of such size that its front end and its sides adjacent such front end will come close to the front and the side flanges of the body, as shown in Fig. 1. The rearwardly extending portion $t$ of the trigger is made with a bent-up perforated flange $t'$.

The rocker shaft $v$ extends through the perforation $m$ of the back flange $c$ and the notch $f$ of the bearing $e$; the outer end of this shaft being turned up as at $w$. The inner end of the shaft has a laterally bent arm $x$, the extremity $y$ of which is bent parallel with the shaft $v$, and has a loose bearing in the perforation $u$ of the flange $t'$ at the inner end of the trigger $p$.

The action of my trap is as follows: When the trap is set, the projecting arm 6 of the jaw $z$ is moved laterally into the notch $o$ of the back flange, and thus secured in place. In so doing the projecting arm 6 will bear against the bent end $w$ of the rocker shaft $v$ and rock the latter in such wise as to lift the front end of the bait-holding trigger $p$. When the trigger is then depressed, it will cause the rocking of the rocker shaft $v$ in the opposite direction, thereby causing the bent end $w$ of the rocker shaft to sweep across the slot $o$, in so doing disengaging the arm 6 of the jaw and releasing the latter, so that the trap may be sprung by the action of the coil spring 7.

I claim:

1. In an animal trap, the combination of a body, a spring-actuated jaw hinged on a transverse axis and having a projecting arm, a bait-holding trigger hinged on an axis parallel to that of the jaw and having a portion extending longitudinally rearward of its hinged axis, a bearing intermediate the hinged axis of the trigger and the rear end of the body, a bearing on such rear end of the body, a rocker shaft which is journaled longitudinally in said intermediate bearings and said rear end, the extremity of said rocker shaft having a laterally extending arm which is operatively connected with the rearwardly projecting portion of said trigger, said bearing on the rear end of the body being provided with a lateral notch adapted to have said projecting arm of the trigger inserted therein, and the outer extremity of the rocker shaft being bent-up to adapt the same to move said projecting arm out of said slot by the rocking of said shaft.

2. In an animal trap, the combination of a body, a spring-actuated jaw hinged on a transverse axis and having a projecting arm, a bait-holding trigger pivotally supported on an axis parallel to that of the jaw, and having a portion extending longitudinally rearward of its hinged axis, means for holding the trigger against lateral movement on its pivotal support, a bearing intermediate the hinged axis of the trigger and the rear end of the body, a bearing on such rear end of the body, a rocker shaft which is journaled longitudinally in said intermediate bearings and said rear end, the extremity of said rocker shaft having a laterally extending arm which is operatively connected with the rearwardly projecting portion of said trigger, said bearing on the rear end of the body being provided with a lateral notch adapted to have said projecting arm of the trigger inserted therein, and the outer end of the extremity of the rocker shaft being bent-up to adapt the same to move said projecting arm out of said slot by the rocking of said shaft.

3. An animal trap comprising a body made of a blank having sides, a front lip, and a rear flange, the body having also a transverse L-shape bearing and a longitudinal rib, a spring actuated jaw hinged on a transverse axis, a bait-holding trigger hinged on an axis parallel to that of the jaw and having a rearward extending portion, the trigger being made with a slot to receive said rib of the body, a rocker-shaft journaled longitudinally in said L-shaped bearing and the rear flange of the body, the extremity of said rocker-shaft having a bent portion which is connected with the inner end of the trigger, the jaw having a projecting arm, the rear flange of the body having a portion cut out and a lateral notch for receiving said arm, the outer end of said rocker shaft being bent so as to move across said notch of the rear flange of the body and thus release said arm of the jaw, when the trigger is actuated.

ALBERT M. GRUBBS.

Copies of this patent may be obtained for five cents each, by addressing the "Commissioner of Patents, Washington, D. C."